(12) United States Patent
Aderhold et al.

(10) Patent No.: US 7,323,054 B2
(45) Date of Patent: Jan. 29, 2008

(54) APPARATUS FOR COATING A MONOLITH SUPPORT

(75) Inventors: Dirk Aderhold, Herts (GB); Alan George Haynes, Herts (GB); Michael Leonard William Spencer, Herts (GB); Duncan John William Winterborn, Milton (GB)

(73) Assignee: Johnson Matthey Public Limited Company, London (GB)

( * ) Notice: Subject to any disclaimer, the term of this patent is extended or adjusted under 35 U.S.C. 154(b) by 176 days.

(21) Appl. No.: 10/430,044

(22) Filed: May 6, 2003

(65) Prior Publication Data
US 2004/0001919 A1    Jan. 1, 2004

Related U.S. Application Data

(63) Continuation of application No. 09/646,064, filed as application No. PCT/GB99/00652 on Mar. 5, 1999, now Pat. No. 6,599,570.

(30) Foreign Application Priority Data
Mar. 19, 1998    (GB) .................................. 9805815.9

(51) Int. Cl.
*B05C 7/04*    (2006.01)
*B05D 7/22*    (2006.01)

(52) U.S. Cl. ........................................ 118/50; 118/429
(58) Field of Classification Search ................ 118/50, 118/429; 427/238, 502
See application file for complete search history.

(56) References Cited

U.S. PATENT DOCUMENTS

| | | | | |
|---|---|---|---|---|
| 4,191,126 A | * | 3/1980 | Reed et al. ..................... | 118/50 |
| 4,384,014 A | * | 5/1983 | Young ......................... | 427/294 |
| 4,609,563 A | * | 9/1986 | Shimrock et al. .............. | 427/8 |
| 4,931,419 A | | 6/1990 | Blanchard et al. | |
| 5,077,093 A | | 12/1991 | Baumgartner et al. | |
| 5,246,457 A | | 9/1993 | Piez et al. | |
| 5,422,138 A | | 6/1995 | Watanabe et al. | |
| 5,543,181 A | | 8/1996 | Fehn et al. | |
| 2001/0026838 A1 | * | 10/2001 | Dettling et al. ............. | 427/230 |

FOREIGN PATENT DOCUMENTS

| | | |
|---|---|---|
| EP | 0 157 651 | 10/1985 |
| EP | 0 202 733 | 11/1986 |
| EP | 0 398 128 | 11/1990 |
| GB | 2 012 616 | 8/1979 |
| JP | 60 012136 | 1/1985 |
| WO | 97/26226 | 7/1997 |
| WO | 97/48500 | 12/1997 |

* cited by examiner

*Primary Examiner*—Laura Edwards
(74) *Attorney, Agent, or Firm*—RatnerPrestia

(57) ABSTRACT

Apparatus for coating a support such as a monolithic catalyst support (5) comprises a dispenser (1) for dispensing a predetermined quantity of coating liquid, a containment (2) for the liquid and a source of vacuum (8, 9) which can be actuated to draw the entire quantity of coating liquid into the support (5). The apparatus and method are particularly useful for coating car catalysts without wastage and with increased design options.

19 Claims, 4 Drawing Sheets

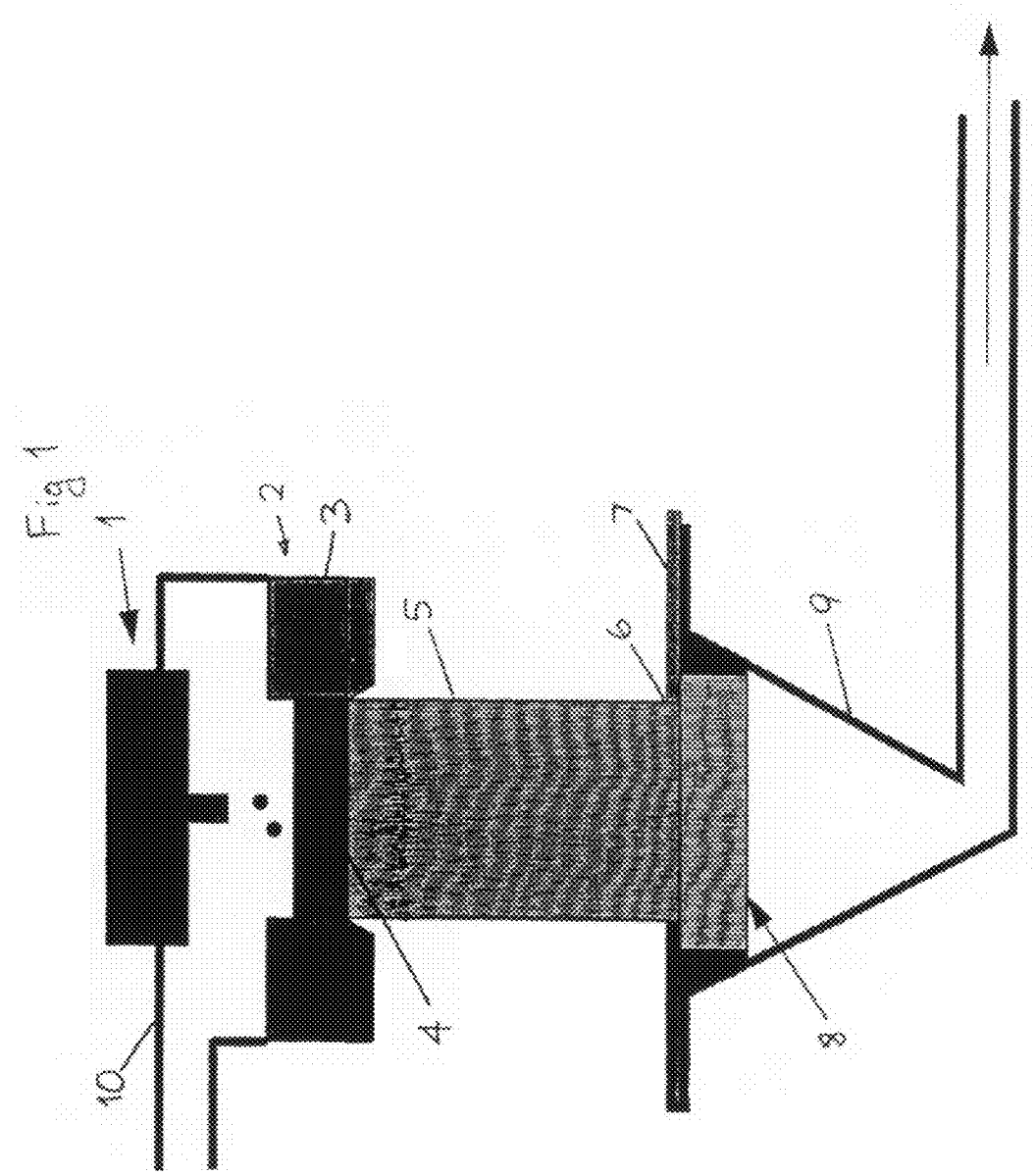

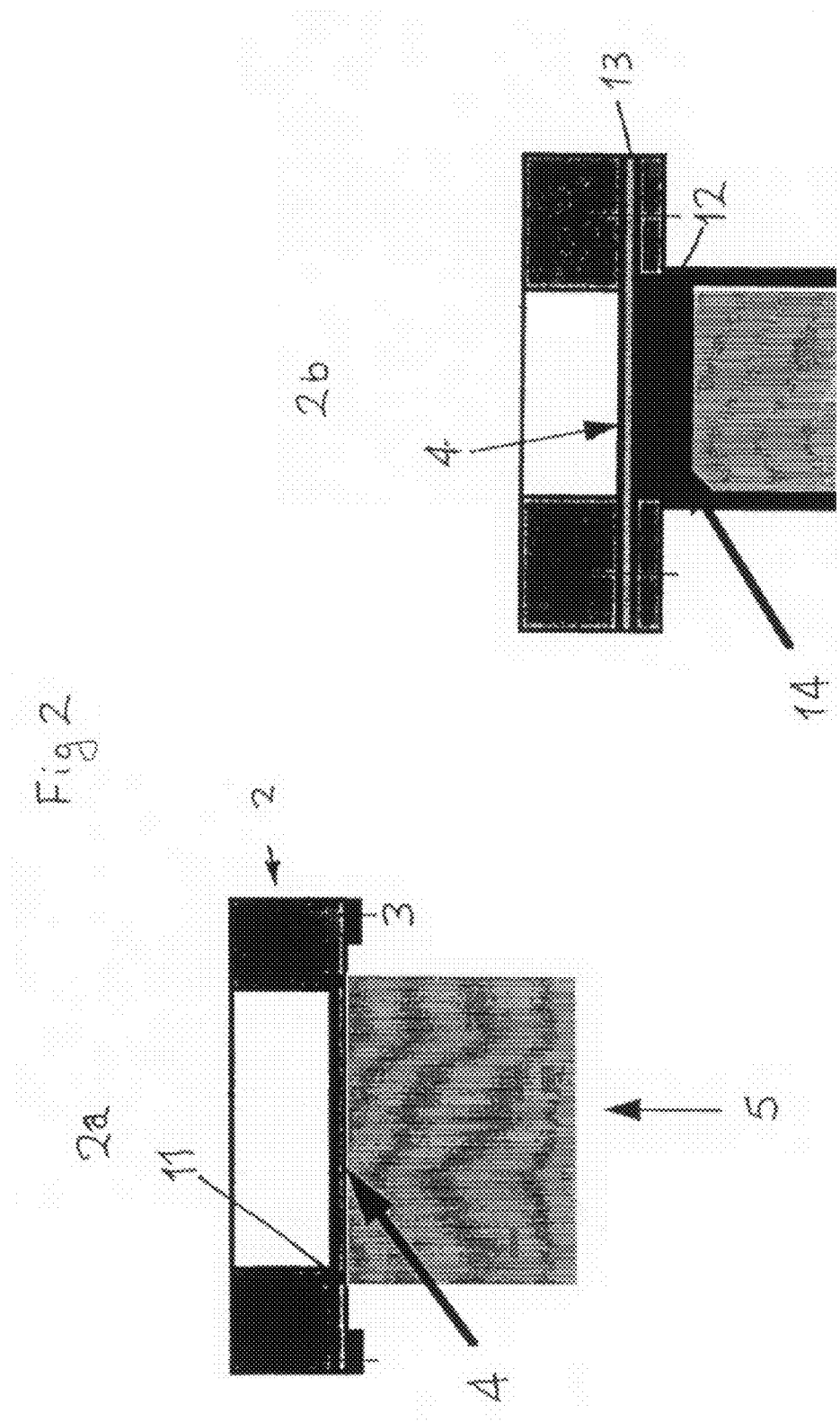

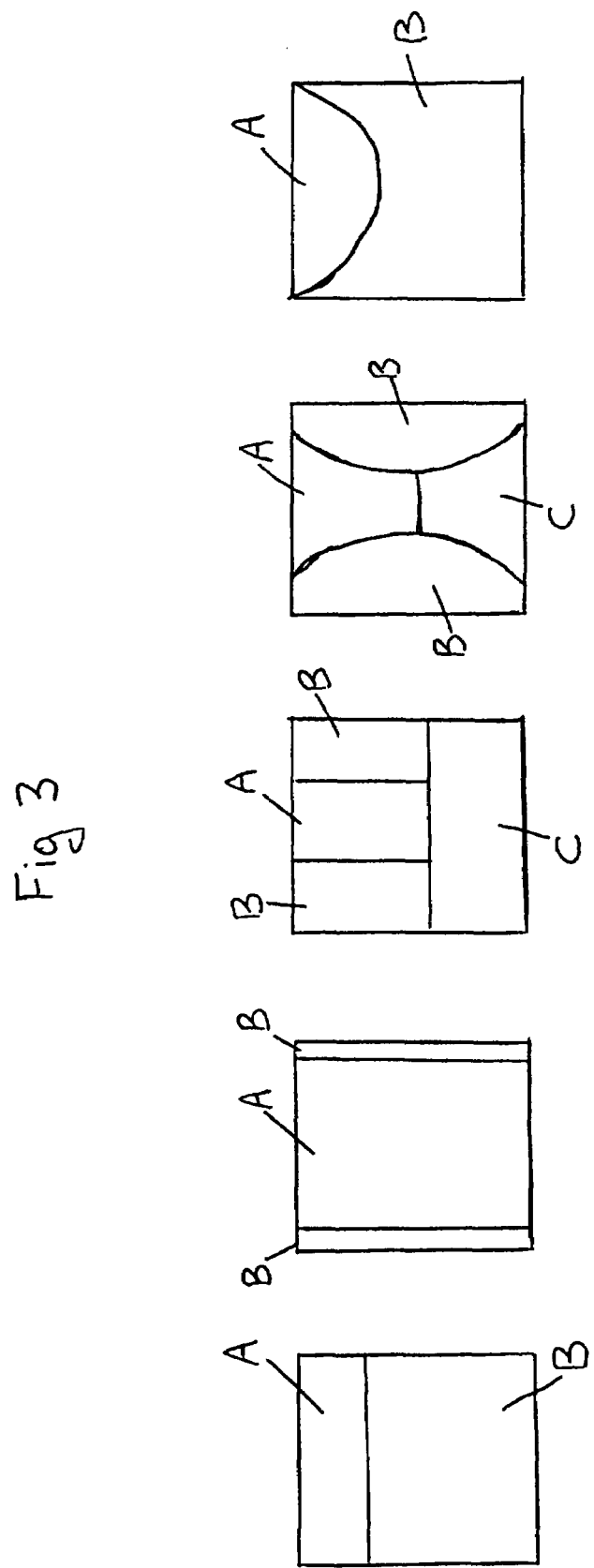

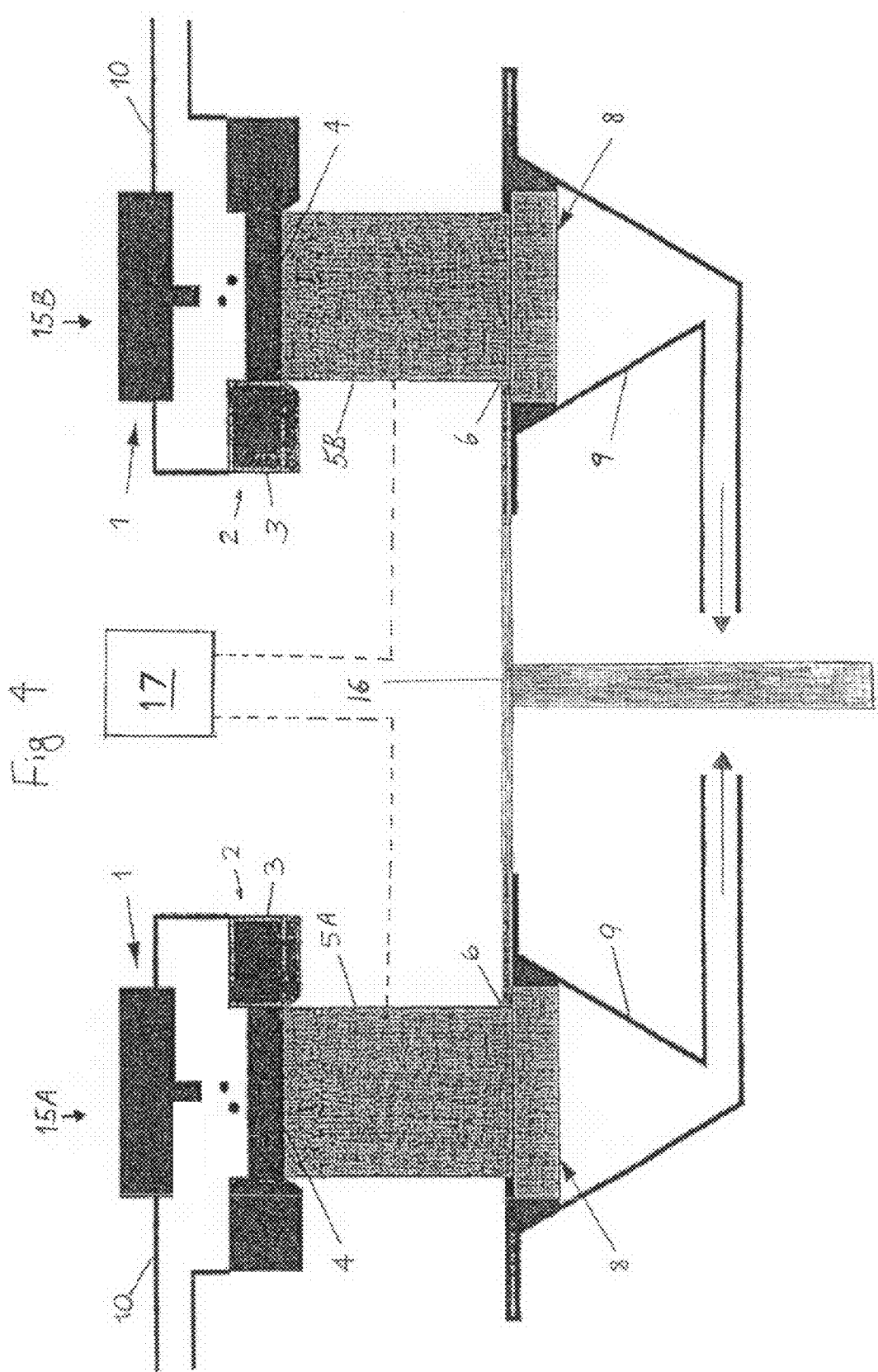

APPARATUS FOR COATING A MONOLITH SUPPORT

This application is a continuation of U.S. patent application Ser. No. 09/646,064 (U.S. Pat. No. 6,599,570), filed Oct. 27, 2000, which is the U.S. National Phase application of International Application No. PCT/GB99/00652, filed Mar. 5, 1999.

The present invention concerns improvements in a manufacturing process, and more especially concerns apparatus and methods suitable for the manufacture of catalysts supported on monolithic supports and like products.

Large numbers of catalysts supported on high surface area monolithic supports are manufactured each year. One of the principal types of such catalyst is the catalytic convertor for the internal combustion engine, and the present invention has particular utility in relation to these. For conciseness, the following description will particularly describe the use of the invention for car catalysts, but it should be understood that the invention may find application in all similar types of catalyst, whether for vehicles ("car catalysts" is intended to include trucks, utility vehicles, buses, motorcycles etc), ships, stationary power sources or gas clean-up from other industrial processes. The present invention is also useful in the manufacturing of like products where a coating is applied to a carrier, and we mention particularly absorber/desorber coatings, many of which are used in exhaust emission control. Such products are not technically "catalysts". We would mention particularly NOx absorbers, hydrocarbon absorbers, absorbers for sulphur compounds, and water vapour absorbers. As well as absorbers for gas treatment, absorbers may find use in heat pumps, eg air conditioning coolers.

The car catalyst is generally supported on an extruded ceramic, eg cordierite, or manufactured metal through-flow honeycomb substrate. The substrates are generally cylindrical, but may be oval or "racetrack" or a skewed oval, and have an effective continuous outer skin. (If the support or substrate does not have a continuous skin, the present invention may be used if the support or substrate is located within a sleeve.) Such substrates are very well known and are commercially available, and may have from 50 to 1200 cells/sq in. In order to increase the surface area for catalysis, it is commonplace to coat the substrate with a washcoat, comprising a slurry of high surface area particles such as alumina, optionally containing other components such as soluble and/or supported catalytically active platinum group metals ("PGMs"), promoters such as ceria, zirconia, barium etc and other components or absorptive materials such as silica, zeolite etc. In some cases, after the washcoat is applied and dried and/or fired to give an adherent coating, one or more catalyst layers is applied. This may be by impregnation of solutions of one or more PGMs, generally selected from one or more of platinum, palladium and rhodium, and/or soluble promoters and/or by applying more layers of the same or different types of catalytically active or absorptive washcoats. The coating processes in use are usually considered as confidential know-how, but are generally variations on immersing the substrate in the slurry or solution, or passing the substrates through a curtain or waterfall of the slurry or solution and using compressed air to blow the fluid into and through the substrate, ensuring coating of the cells and also ensuring that there are no or practically no blocked cells.

We have realised that such processes are not very flexible and have a number of other disadvantages. The slurry or solution is recycled, but the absorption characteristics of the substrate or washcoated substrate are such that certain components, eg finer particles or certain dissolved platinum group metal salts, deposit preferentially, thus changing the composition of the recycled fluid and accordingly altering some of the characteristics of the subsequently coated catalysts. We have accordingly realised that continuous processes may not provide the best answer for producing catalysts with identical performance and other characteristics. The present invention provides a batch or semi-batch process that offers very significant improvements in producing car catalysts, with advantages in consistency and control of raw materials, as well as offering catalyst design options not previously available for large scale manufacturing. It is believed that the present invention may have particular applicability in the coating of very high cell density substrates which are difficult to coat using conventional technology.

We are aware of some prior proposals which have some of the objectives of the present invention. For example, in U.S. Pat. No. 5,543,181, catalyst solution is sprayed into the cells of a honeycomb support through probes which are inserted into the cells. Such a system is mechanically complex and not capable of coping with very high cell density substrates. U.S. Pat. No. 4,931,419 discloses a method of soaking one end of a monolithic support in a specified volume of liquid, equal to the pore volume of the support and turning the monolithic support over to cause the liquid to drain through the support. Such a method still permits losses of valuable precious metal catalysts. U.S. Pat. No. 5,422,138 teaches a coating apparatus involving dipping the base of a monolithic support into a coating liquid then blowing excess liquid from the cells. WO 97/48500 describes a further catalyst coating system where a substrate is partially immersed in a coating liquid, a vacuum is applied to draw the liquid up into the cells of the substrate to a distance less than the length of the cells. Such a system is not very flexible and still recycles coating liquid.

A further proposal is disclosed in GB 2,012,616, which discloses apparatus and methods for coating catalyst substrates using a measured charge of slurry which is drawn into and through the substrate. It is clear that the charge of slurry is such that it is in excess of that actually required to coat the substrate. It is not believed that this proposal was ever developed to the stage of commercial utility. We believe that the fact that excess slurry is used, which is recycled for re-use, results in the alteration of composition in time as various components of the slurry deposit preferentially onto the walls of the substrate.

The present invention provides a monolithic support coating apparatus, comprising means for dosing a predetermined quantity of a liquid component such quantity being such that it is substantially wholly retained within the intended support, liquid component containment means locatable on the top of a support to receive said quantity of liquid component and pressure means capable of withdrawing the liquid component from the containment means into at least a portion of the support.

The invention further provides a method of coating a monolithic support, comprising the steps (a) locating a containment means on top of a support, (b) dosing a predetermined quantity of a liquid component into said containment means, either in the order (a) then (b) or (b) then (a), and (c) by applying pressure or vacuum, drawing said liquid component into at least a portion of the support, and retaining substantially all of said quantity within the support. The method may, but need not, provide plug flow into the support.

Desirably, no more than 1 wt % of the liquid, more preferably no more than 0.5%, especially none of the liquid, is drawn through the substrate and expelled.

The liquid component may be any liquid used to coat a monolithic support, whether or not it contains catalytic components. In general, this will be a slurry of particles, eg absorber or a washcoat slurry, or a solution of catalytically active components, although for certain advanced design catalysts, a washcoat slurry may contain catalytically active particles or solutions. The actual composition of the liquid component is not important for the present invention.

Part of the present invention is a liquid component containment means which is located on top of a support to be coated. Whilst the design and function of this will be better appreciated from the specific description hereinafter, it should be understood to comprise at least a wall generally corresponding to the cross-sectional shape of the support. It may also comprise a permeable base closing the walls to form a container. The wall may be manufactured from plastics, including polypropylene or preferably PTFE, metal, especially stainless steel or PTFE-coated stainless steel, or ceramic, and the base may be a perforated or porous metal plate, sintered metal sponge, a woven or non-woven fabric or a synthetic open cell foam. In certain embodiments, the base or part thereof may be moveable in the manner of a guillotine, iris or shutter; or a separate permeable base, for example applied to the face of the support, may be used. Combinations of different materials may be used, for example, the foam is useful to distribute the liquid evenly across the face of the support, and hence ensure even coating. For certain coating components, the rheology may be such that the component does not begin to enter the cells of the support until pressure or vacuum is applied, and hence no permeable base is required to contain the liquid component.

The containment means need not, and in certain preferred embodiments is designed not to, contain and hence locate the liquid component over the entire upper surface area of the support. The containment means may be shaped to blank off areas of the support, so that coating is not carried out in those areas. For example, in a car catalyst or absorber which is mounted in a housing in the exhaust, the support is sealed around its edges to prevent gas flow by-passing the support. The effect is to seal off a circumferential quantity of cells, so that these cells are not used for catalysis or absorption/desorption and therefore their content of precious metal catalyst or absorber may be considered to be wasted. The present invention offers the possibility of not coating such circumferential cells. It is also well understood that for a variety of reasons, gas flow is concentrated in the central portion of a monolith, and the present invention permits such a central portion to be coated with a different composition and/or different concentration of components. Accordingly, the containment means may be divided internally to separate different liquids for coating, or parts may be blanked off to prevent coating. It is within the present invention to modify the base of the containment means to achieve a desired coating profile or to yield a desired product. For example, the base may have differing permeability to give easier flow, and hence greater coating deposits, in certain regions, or the base may itself act as a profiled containment means, eg by machining a honeycomb monolith, so that certain regions contain greater quantities of liquid component which are transferred directly to corresponding parts of the support located below the base.

It will be understood that the containment means is desirably provided with sealing means effective to prevent loss of coating liquid when pressure/vacuum is applied. Such sealing may be achieved by using a deformable permeable base, or by a separate seal. One preferred type of seal is an inflatable seal, which may be inflated and deflated under machine control. An inflatable seal permits the apparatus to cater for variations in substrate diameter or circumference. If all the cells of a honeycomb support, or all the area of any other type of support, require to be coated, it is not possible to seal on the top face of the support and accordingly a suitable seal against the outer side of the support enables the coating liquid to access the whole of the support.

It is possible to conceive of the development of accurate dosing means which together with a gel-like liquid component, deposits the coating component onto a support without requiring containment means. This modification of the present invention may be considered as using the structure of the liquid component itself as the containment means and hence is within the scope of the invention.

The liquid dosing means may be engineered using generally known principles. For example, there are commercially available machines capable of highly accurate dosing by volume or weight of liquids, for example used for filling in the fold or paint industry. These machines are capable of handling liquids of many different viscosities and rheologies. We believe that the accuracy of dosing using current technology is ±0.1 wt %. This permits a very significant improvement in coating accuracy according to the present invention. It should also be mentioned that the accuracy of the coating process is also dependent upon the accuracy of the liquid (solution or slurry) analysis. However, the invention offers greatly increased opportunities for control of all aspects of coating.

It is desirable to combine the dosing means with automatic handling equipment, which may include a rotatable indexed table capable of moving supports past a number of work stations at which the various stages of the method may take place. Robotic handling may be provided to load and unload supports, and it is envisaged that the method may be used to part-coat the support in the axial direction, then turn the part-coated support and coat the remainder from the other face. It will be appreciated that the basic apparatus is extremely flexible, and can be designed to have easily changeable dosing means and containment means, and a number of different coating functions may be carried out in the same apparatus. Of course, the invention includes essentially manual operation, which may be appropriate for low volume, low labour cost applications.

In a further embodiment of the present invention, the dosing head and containment means are combined into a unitary structure which may be located on top of the support, and either moved into fluid connection with a source of the coating liquid, or is permanently connected thereto, possibly using flexible lines to permit movement of the dosing head and/or the support.

The apparatus and method of the invention may provide plug flow of the dispensed quantity of liquid into the support. An important characteristic of the invention is that substantially all of the liquid is retained within the support, ensuring even distribution in the desired pattern, and ensuring that there is no significant excess liquid requiring recycling. Any small quantities of liquid which are not retained within the support are captured in the preferred embodiments in the vacuum hood as illustrated hereinafter, thus improving the health and safety environment.

Although the invention may operate using air pressure or a combination of air pressure and vacuum to initiate transfer of the liquid from the containment means into the support, we presently prefer to use the application of a vacuum to the bottom of the support, causing normal air pressure to force the liquid into the cells of the support. If necessary, a pulse of air flow may be initiated to clear the cells of the support and prevent blockages. In more advanced embodiments, the vacuum itself may be non-uniformly applied either temporally or spatially.

The quantity of liquid component is pre-determined according to the desired coating design and the behaviour of the liquid component to coat the support without excess, by conventional experimental methods. The liquid is desirably stored in a large volume container which may be stirred and will be replenished from time-to-time. Since the apparatus provides accurately measured volumes and no recycling, the quality or composition of the liquid component remains constant, and losses are reduced.

A particular advantage of the invention in the manufacture of catalysts is that usage of precious metal is very well controlled, and it is not so necessary to over-specify metal loadings in order to cope with process variations.

After coating, the support may be dried, and fired if required, to fix or transform the coating.

The invention will now be described by way of example only with reference to the accompanying drawings, in which FIG. 1 is a schematic cross-section of an apparatus according to the invention, FIG. 2 is a schematic cross-section of two designs of containment means, and FIG. 3 are schematic cross-sections of different product catalysts produced according to the present invention.

FIG. 4 is a schematic cross-section of an alternative embodiment of an apparatus according to the invention.

Referring to FIG. 1, a liquid dosing head is generally indicated by 1. This may be adapted from a food container filling machine. The dosing head draws pre-determined volumes of liquid from a pre-mixed supply held in a reservoir (not shown). A containment means, 2, consists of an annular wall, 3, having a permeable membrane base, 4. The containment means is locatable on top of a catalyst support unit, 5, which may be an extruded honeycomb monolith. The monolith 5 is located in a depression, 6, in a work table, 7, the depression being closed by an air-permeable base, 8. A vacuum hood, 9, is sealed around the permeable base 8 and is connected to a controlled source of vacuum. The containment means 2 is shown mounted with a further hood, 10, which is optional and may be used to apply pressure to the liquid held in the containment means.

From the figure, it can readily be appreciated that the predetermined volume of liquid is held above the monolith until vacuum and/or over-pressure is applied, at which time the liquid is drawn into and retained within the cells of the monolith. Plug flow was observed.

Referring to FIG. 2, two head designs are illustrated, particularly suitable for relatively low viscosity liquids such as impregnation solutions. In the drawings, the same identification numbers are used as in FIG. 1. In FIG. 2a, a seal, 11, is shown to contact the upper surface of the monolith, 5. In FIG. 2b, this design is particularly adapted for a metal monolith which has an upstanding lip, 12. The base 4 of the containment means consists of a perforated metal plate, 13, combined with a deformable open cell foam disc, 14. It can be seen that when the containment means is brought down onto the lipped monolith, the foam deforms to provide sealing and a suitable distribution of liquid when liquid flow is initiated.

FIG. 3 illustrates the different catalyst designs that can be produced according to the present invention. Taking the catalysts as generally cylindrical, different concentrations and/or different washcoat and/or catalyst formulations and profiles may be achieved as indicated by different letters A, B and C. It will readily be appreciated that the opportunities for catalyst design to meet specific requirements are greatly increased by the present invention.

FIG. 4 illustrates an alternative embodiment of the apparatus of the present invention in which the invention may comprise a control means for moving the monolithic support. As shown, the control means may, for example, include a rotatable indexed table 16 capable of moving the supports past workstations 15A and 15B at which the various stages of the coating may take place. Further, robotic handling 17 may be provided to load and unload the supports. For example, at workstation 15A the top of the monolith support 5A is partially coated in the axial direction with the liquid component. Robotic handling 17 turns the partially coated monolithic support 5A and the rotatable indexed table 16 moves the partially-coated monolith support to a second workstation 15B. At workstation 15B, the bottom of a partially-coated monolith support, shown as 5B, is coated with a liquid component to coat the remaining part of the monolith substrate in the axial direction.

Although the above description has concentrated on coating car catalysts, the invention may, as has been mentioned, coat many other similar products, and absorbers are particularly suitable. Indeed, the invention permits an absorbent coating to be applied to the same monolithic support as a catalyst coating.

The skilled person may readily change many of the details described without departing from the inventive concept.

The invention claimed is:

1. A system for coating a monolithic support with a liquid component, the monolithic support having a top, a bottom, and a plurality of cells, which system comprising:
    (a) means for dosing a pre-determined quantity of the liquid component to the top of the monolithic support,
    (b) liquid component containment means comprising a base permeable to the liquid component releasably coupled to the top of the monolithic support for receiving the pre-determined quantity of the liquid component, and
    (c) vacuum means mounted to the bottom of the monolithic support for applying vacuum to the bottom of the monolithic support to withdraw the entirety of the quantity of the liquid component dosed on the top of the monolithic support and contained by the containment means into at least a portion of the plurality of the cells of the monolithic support,
    wherein the liquid component has a rheology such that:
        (1) the liquid component does not flow into the plurality of the cells of the monolithic support when placed on the top of the monolith in the absence of any application of a vacuum by the vacuum means, and
        (2) the liquid component flows into the plurality of the cells of the monolithic support, as plug flow of the liquid component in the cells of the monolith support, upon application of a vacuum by the vacuum means,
    and wherein the system is adapted to retain all of the pre-determined quantity of the liquid component dosed by the means for dosing within the plurality of the cells of the monolithic support.

2. The system according to claim 1, wherein the base is selected from the group consisting of a perforated metal plate, a porous metal plate, a sintered metal sponge, a woven fabric, a non-woven fabric, and a synthetic open cell foam.

3. The system according to claim 1, wherein the base or a part thereof comprises a moveable part.

4. The system according to claim 1, wherein the containment means is shaped to cause differential coating of parts of the monolithic support.

5. The system according to claim 4, wherein an air-permeable base is used to support the bottom of the monolithic support.

6. The system according to claim 1, wherein the liquid component comprises a slurry of particles.

7. The system according to claim 1, wherein the liquid component comprises a solution of catalytically active components.

8. The system according to claim 1, wherein the containment means comprises a wall having a shape corresponding to the cross-sectional shape of the top of the monolithic support.

9. The system according to claim 1, wherein the containment means is divided internally for separating different liquids for coating.

10. The system according to claim 1, wherein the base has differing permeability to cause differential coating of the plurality of the cells of the monolithic support.

11. The system according to claim 1, wherein the containment means comprises a sealing means for preventing loss of the liquid component when the containment means is positioned on the top of the monolith.

12. The system according to claim 1 further comprising control means for automatically moving the monolithic support to the containment means.

13. The system according to claim 12, wherein the control means comprises a rotatable indexed table.

14. The system according to claim 1 wherein the system comprises a first workstation and a second workstation each having one of said: (1) means for dosing; (2) containment means; and (3) vacuum means, wherein said first workstation doses the liquid component to the top of the monolithic support, and partially coats the cells of the monolith support in the axial direction from top to bottom, the system further comprises means for turning the partially-coated monolithic support, and said second workstation doses the liquid component to the bottom of the partially-coated monolithic support, and coats a remaining part of the monolith substrate in the axial direction.

15. The system according to claim 1, wherein the dosing means and the containment means are a unitary structure.

16. The system according to claim 3, wherein the moveable part is in the form of a guillotine.

17. The system according to claim 3, wherein the moveable part is in the form of an iris.

18. The system according to claim 3, wherein the moveable part is in the form of a shutter.

19. The system according to claim 3, wherein the moveable part is in the form of a separate permeable base.

* * * * *